No. 663,233. Patented Dec. 4, 1900.
W. KINGSLAND.
CONNECTION OF STRIKERS TO MOTOR VEHICLES FOR MECHANICALLY OPERATING ELECTRIC SWITCHES.
(Application filed July 10, 1900.)
(No Model.) 3 Sheets—Sheet 1.
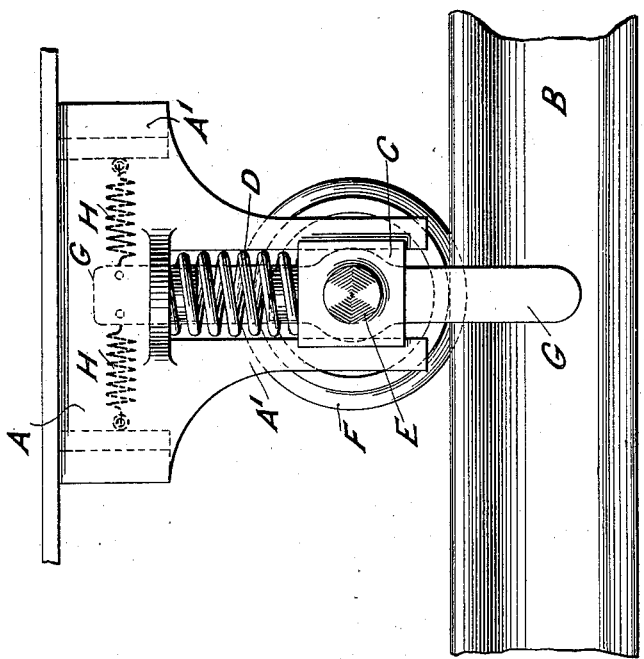
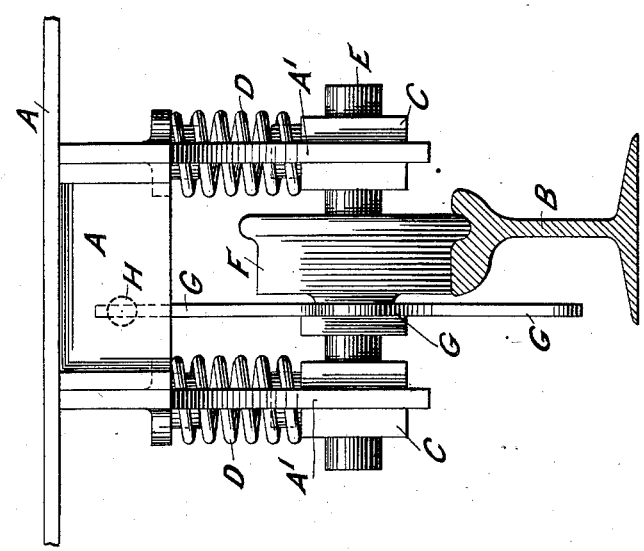
Witnesses
Chas. H. Smith
A. T. Serrell
Inventor
William Kingsland
per L. W. Serrell & Son
attys No. 663,233. Patented Dec. 4, 1900.
W. KINGSLAND.
CONNECTION OF STRIKERS TO MOTOR VEHICLES FOR MECHANICALLY OPERATING ELECTRIC SWITCHES.
(Application filed July 10, 1900.)
(No Model.) 3 Sheets—Sheet 2.
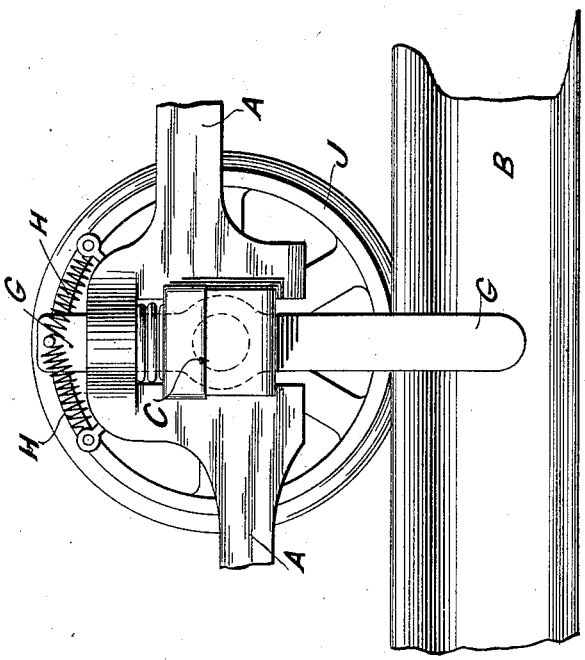
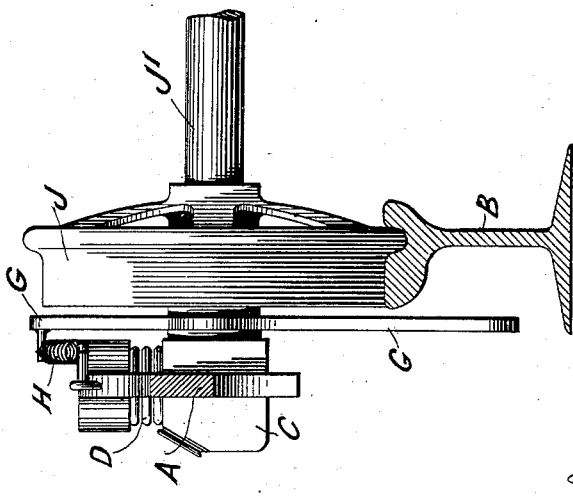
Witnesses
Inventor
William Kingsland No. 663,233. Patented Dec. 4, 1900.
W. KINGSLAND.
CONNECTION OF STRIKERS TO MOTOR VEHICLES FOR MECHANICALLY OPERATING ELECTRIC SWITCHES.
(Application filed July 10, 1900.)
(No Model.) 3 Sheets—Sheet 3.
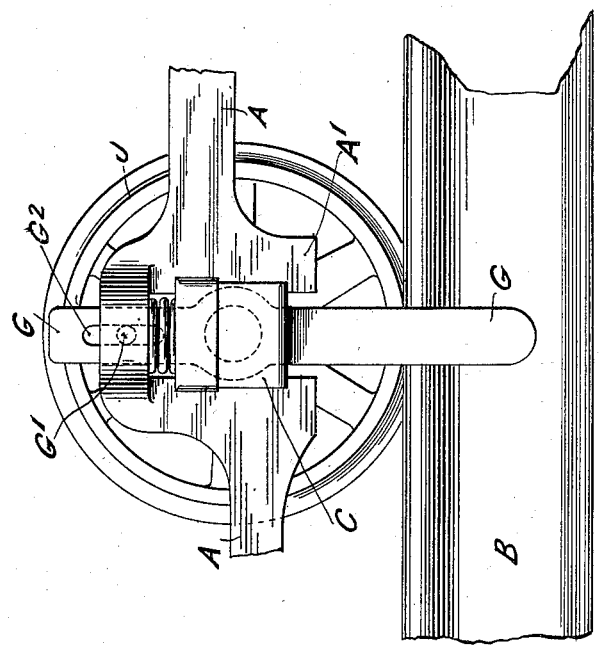
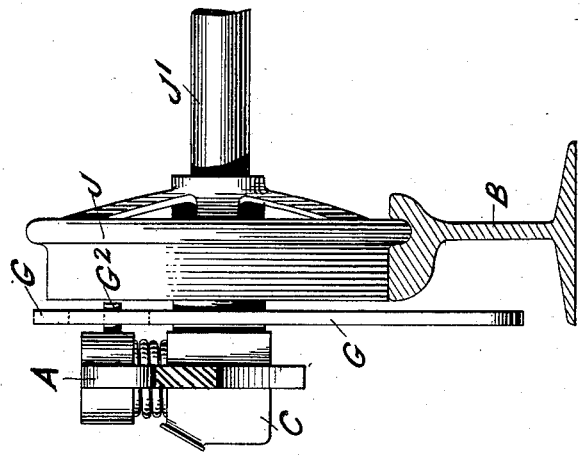

UNITED STATES PATENT OFFICE.

WILLIAM KINGSLAND, OF LONDON, ENGLAND.

CONNECTION OF STRIKERS TO MOTOR-VEHICLES FOR MECHANICALLY OPERATING ELECTRIC SWITCHES.

SPECIFICATION forming part of Letters Patent No. 663,233, dated December 4, 1900.

Application filed July 10, 1900. Serial No. 23,099. (No model.)

*To all whom it may concern:*

Be it known that I, WILLIAM KINGSLAND, electrical engineer, a subject of the Queen of Great Britain, residing at 8 Breams Buildings, Chancery Lane, in the city of London, England, have invented a certain new and useful Improved Connection of Strikers to Motor-Vehicles for Mechanically Operating Electric Switches, (for which I have made application for patent in Great Britain, dated December 13, 1899, No. 24,792,) of which the following is a specification.

In electric traction I have before proposed to provide motor-vehicles running upon rails with depending bars, which in this specification I term "strikers," the office of these strikers being to mechanically operate electric switches for opening and closing electric circuits as the vehicle passes along the line of rails. Such strikers operate by tappet action upon mechanism by which the switches are moved, and it is therefore desirable that the strikers should be maintained always in one position relatively to the rails and to the tappet or other mechanism upon which the said strikers are to act. Moreover, in some cases it is also desirable that the strikers should have a certain amount of yielding or resilient motion in the direction in which they act upon the switch-operating mechanism.

Now my invention refers to means, as hereinafter described and claimed, whereby the strikers are maintained in a constant relative position to the rails and are not affected by the rise and fall of the motor-vehicle or by the passage of the same around a curve, while the striker, when required, is so fitted as to yield somewhat in the direction of its action to the blow or impact against the switch mechanism.

I will describe my invention with reference to the accompanying drawings, whereon—

Figure 1 is a front elevation, and Fig. 2 is a side elevation, showing an arrangement of my invention where the striker is carried by a small wheel or wheels or by a "bogie." Fig. 3 is a sectional front elevation, and Fig. 4 is a side elevation, showing the striker elastically controlled and fitted upon the axle of the motor-wheels; and Figs. 5 and 6 show, respectively in sectional front elevation and in side elevation, a striker fitted according to my invention, but without the means for elastic control.

Referring to Figs. 1 and 2 of the drawings, A is a framework, either forming part of the motor-vehicle or fixed or connected thereto in any suitable position relatively to the said motor-vehicle. Above one of the track-rails B there are two parallel slotted guide-plates A' A' to carry bearing-blocks or brasses C C, capable of vertical motion in the guide-plates A' A' against the action of springs D D. The bearing-blocks C carry a shaft E, capable of revolving therein and carrying a small wheel F, which runs upon the track-rail B. The shaft E is capable of lateral motion to some extent in the bearings C, and the wheel F being keyed upon the said shaft between the bearings the lateral motion of the shaft E is thereby limited.

Loosely upon the shaft E and adjacent to the wheel F, I mount the striker G, the said striker G extending upward and the position of its upper end being normally maintained by means of springs H H. By this arrangement the vertical and lateral position of the striker relatively to the track-rail is always maintained constant, because any rise and fall of the car (by reason of the varying weights carried therein) is allowed for by the motion of the frame A upon the bearing-blocks C, and any change in the lateral position of the striker relatively to the rails is obviated by automatic lateral motion of the shaft E.

As previously stated, the striker may in some instances be carried upon the axle of the motor-car wheels, and this is shown at Figs. 3 and 4.

J is one wheel, and J' the axle, of the car. Loosely upon this axle J', I mount the striker G, as shown, its upper end being maintained in position by the springs H H.

A is the framework of the vehicle, and C is a bearing-block upon which the frame A may have a vertical motion, and the position of the striker relatively to the rail and to the switch-operating mechanism is maintained and the striker is resiliently carried, as with the construction previously described with reference to Figs. 1 and 2.

It is obvious that the striker need not be in all cases elastically held, but may be otherwise supported. Thus, as shown at Figs. 5 and 6, the upper end of the striker G may be controlled by a rigid guide formed by, for example, a pin G', fixed in the frame A and entering a vertically-extending slot G² in the striker.

What I claim as my invention, and desire to secure by Letters Patent, is—

1. In operating electric switches by tappet action from a motor-vehicle running on rails: the combination of a striker carried by an axle, a wheel upon the axle to run upon the track-rail, a frame connected to the motor-vehicle to carry the axle, and means for permitting the frame to have vertical motion relatively to the axle, whereby the position of the striker is maintained constant relatively to the track-rail and to the switch-operating mechanism, and means for maintaining the acting end of the striker in a working position in the direction of its action substantially as set forth.

2. In operating electric switches by tappet action from a motor-vehicle running on rails: the combination of a striker mounted upon an axle, a wheel upon the axle to run on the track-rail, a frame connected to the motor-vehicle, vertical guides on the frame, and sliding bearing-blocks in the guides to carry the wheel-axle so that the frame may move vertically upon the bearing-blocks which it carries, and whereby the position of the striker is maintained constant relatively to the rail and to the switch-actuating mechanism, and means for maintaining the acting end of the striker in a working position in the direction of its action, substantially as set forth.

3. In operating electric switches by tappet action from a motor-vehicle running on rails: the combination of an axle, a striker mounted upon the axle, a wheel fixed upon the axle to run on the rail-track, a frame connected to the motor-vehicle, bearings in which the striker-carrying axle is free to revolve and to have lateral motion in the direction of its axis, guides in the aforesaid frame to carry the bearings and allow of the frame having vertical motion upon the said bearings, and means for maintaining the acting end of the striker in a working position in the direction of its action, substantially as set forth.

4. In operating electric switches by tappet action from a motor-vehicle running on rails: the combination of an axle, a striker-bar loosely mounted upon the axle but prevented from lateral motion thereon, a wheel fixed upon the axle to run on the track-rail, a frame connected to the motor-vehicle, bearings in which the striker-carrying axle is free to revolve and also to move laterally therein in the direction of its axis, guides in the aforesaid frame to carry the bearings and allow of the frame having vertical motion upon the said bearings, and means to connect the freely-carried striker to the framework of the vehicle to maintain the acting end of the striker in a working position in the direction of its action, substantially as set forth.

WILLIAM KINGSLAND.

Witnesses:
GRIFFITH BREWER,
THOMAS W. ROGERS.